United States Patent
Miranda et al.

(10) Patent No.: US 10,774,205 B2
(45) Date of Patent: Sep. 15, 2020

(54) ETHYLENE ALPHA-OLEFIN COPOLYMERS WITH MULTIMODAL COMONOMER DISTRIBUTIONS AND PROCESSES FOR OBTAINING THE SAME

(71) Applicant: Braskem S.A., Camaçari (BR)

(72) Inventors: Marcia Silva Lacerda Miranda, São Paulo (BR); Daiane Schilling de Vargas, São Paulo (BR); Adriane Gomes Simanke, São Paulo (BR); Rodrigo Brambilla, São Paulo (BR); Arthur Alaim Bernardes, São Paulo (BR)

(73) Assignee: Braskem S.A., Camaçari (BR)

( * ) Notice: Subject to any disclaimer, the term of this patent is extended or adjusted under 35 U.S.C. 154(b) by 78 days.

(21) Appl. No.: 16/025,418

(22) Filed: Jul. 2, 2018

(65) Prior Publication Data

US 2019/0002676 A1   Jan. 3, 2019

Related U.S. Application Data (60) Provisional application No. 62/528,113, filed on Jul. 2, 2017.

(51) Int. Cl.
  *C08J 5/18*   (2006.01)
  *C08L 23/08*   (2006.01)
  *C08J 3/00*   (2006.01)

(52) U.S. Cl.
  CPC ........... *C08L 23/0815* (2013.01); *C08J 3/005* (2013.01); *C08J 5/18* (2013.01); *C08J 2323/08* (2013.01); *C08J 2423/08* (2013.01); *C08L 2203/10* (2013.01); *C08L 2203/16* (2013.01); *C08L 2203/162* (2013.01); *C08L 2205/025* (2013.01); *C08L 2205/03* (2013.01); *C08L 2314/06* (2013.01)

(58) Field of Classification Search
  CPC . C08J 3/005; C08J 5/18; C08J 2323/08; C08J 2423/08; C08L 23/0815; C08L 2314/06; C08L 2205/03; C08L 2205/025; C08L 2203/10; C08L 2203/16; C08L 2203/162; C08F 210/16; C08F 4/65904
  See application file for complete search history.

(56) References Cited

U.S. PATENT DOCUMENTS

| | | |
|---|---|---|
| 5,869,575 A | 2/1999 | Kolthammer et al. |
| 6,610,408 B1 | 8/2003 | Srinivasan et al. |
| 2009/0306299 A1 | 12/2009 | Kipke et al. |
| 2011/0313111 A1* | 12/2011 | Fantinel et al. ...... C08F 210/16 525/240 |
| 2013/0216736 A1* | 8/2013 | Sandkuehler et al. ......... E01C 13/08 428/17 |

* cited by examiner

*Primary Examiner* — Nathan M Nutter
(74) *Attorney, Agent, or Firm* — Osha Liang LLP (57) ABSTRACT

A polymer composition may include a plurality of ethylene-based polymers forming a multimodal composition distribution, each having a distinct crystallization peak in a CEF curve. A process of making a polymer composition may include melt blending a plurality of polyethylenes with different microstructural characteristics in the molten state. Another process of making a polymer composition may include polymerizing ethylene and an optional alpha olefin in combination with a plurality of metallocene catalysts in a polymerization reactor to form a plurality of ethylene based polymers. Yet another process of making a polymer composition may include polymerizing ethylene and an optional alpha olefin in combination with a multimetal catalyst in a polymerization process to form a plurality of ethylene based polymers.

27 Claims, 3 Drawing Sheets

ETHYLENE ALPHA-OLEFIN COPOLYMERS WITH MULTIMODAL COMONOMER DISTRIBUTIONS AND PROCESSES FOR OBTAINING THE SAME

BACKGROUND

Polyethylene is the most widely used thermoplastic polymer in the world, being made into products ranging from clear food wrap and plastic bags to laundry detergent bottles and automobile fuel tanks. Among the different polyethylene types, linear low density polyethylene (LLDPE) represents almost 30% of the total polyethylene, and the development of new catalysts and process technologies has motivated continuous improvement of its properties and the ability to tailor it for a wide range of applications. These resins represent a considerable advance in physical properties over the long chain branched low density polyethylenes (LDPEs), made by conventional high pressure process.

It is well known that polyethylene may be prepared by the polymerization of ethylene (optionally with one or more alpha-olefins such as butene-1, hexene-1, octene-1, etc) using coordination catalysts, such as Ziegler-Natta systems which comprises a transition metal compound. Polyethylene produced in this manner, particularly LLDPE, is in widespread commercial use. However, this conventional LLDPE, suffers from a number of deficiencies such as, high amount of low molecular weight and also large amount of very high molecular weight homopolymer of ethylene. The heterogeneous nature of these polymers generally detracts from the physical properties made from them. A great deal of effort has been directed towards the preparation of more homogeneous LLDPE resins, which mitigate this problem, such as the development of catalytic systems, such as metallocenes or post-metallocenes, with better comonomer responses (alpha-olefins) and producing less wax content.

The molecular weight distribution of a polymer is a very important factor in determining its mechanical properties and processing behavior. It is generally found that the mechanical properties of a polymer deteriorate with broadening MWD. Polymers with narrower MWD crystallize more uniformly and exhibit better physical properties such as increased dimensional stability, higher impact resistance, greater toughness at low temperatures and higher resistance to environmental stress cracking. However, broadening of the MWD enhances the polymer processability. In an extrusion process, resins with broader MWDs exhibit lower viscosities at processing shear rates. One method of tailoring the property-processing relationship is to control the shape of the MWD. For many industrial resins, especially for pipe grade PEs, the MWDs are very broad and sometimes bimodal. Bimodal resins have a high molecular weight component to impart strength and toughness and a low molecular weight component to facilitate extrusion.

The comonomer distribution is also an important property that can be tailored for the desired application. For Ziegler-Natta LLDPE, it is generally found that the comonomer distribution is broad and uneven. A greater concentration of comonomer is found on the shorter chains. Single-site LLDPE, such as LLDPE produced by metallocene catalysts, has a narrow and more uniform distribution of comonomer. A recent trend is to produce resins with 'reverse comonomer distributions' in which the comonomer is placed on the high molecular weight chains.

Blending of two or more polymers is often applied to control the overall property profile of materials and/or to aim for cost reduction. For polyethylene resins, blending primarily aims at improving the balance of processability and mechanical properties of the final product. Important industrial applications comprise: blending of polyethylenes with different molecular weights, thus achieving broad molecular weight distributions, and blending of homo- and copolymers with different degrees of branching and branching types.

Blending can be achieved by: post-polymerization mixing of the different polymers, e.g., in an extruder, or, more conveniently, by directly generating the different polymers during the polymerization process ('reactor blending'). The latter technique can employ multiple reactors, generating different polymers by varying the reaction conditions in each reactor, or within a single reactor two or more polymerization catalysts can be used. For metallocene or Ziegler-Natta catalysts, reactor blending is well established and is applied on an industrial scale.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to. a polymer composition that includes a plurality of ethylene-based polymers forming a multimodal composition distribution, each having a distinct crystallization peak in a CEF curve.

In another aspect, embodiments disclosed herein relate to a film that includes a polymer composition that includes a plurality of ethylene-based polymers forming a multimodal composition distribution, each having a distinct crystallization peak in a CEF curve.

In another aspect, embodiments disclosed herein relate to a process of making a polymer composition may include melt blending a plurality of polyethylenes with different microstructural characteristics in the molten state.

In yet another aspect, embodiments disclosed herein relate to a process of making a polymer composition may include polymerizing ethylene and an optional alpha olefin in combination with a plurality of metallocene catalysts in a polymerization reactor to form a plurality of ethylene based polymers.

In yet another aspect, embodiments disclosed herein relate to a process of making a polymer composition may include polymerizing ethylene and an optional alpha olefin in combination with a multimetal catalyst in a polymerization process to form a plurality of ethylene based polymers.

Other aspects and advantages of the claimed subject matter will be apparent from the following description and the appended claims.

DETAILED DESCRIPTION

In one aspect, embodiments disclosed herein relate to ethylene-based polymer compositions having a multimodal composition distribution. For example, embodiments of the present disclosure relate to compositions containing a plurality of ethylene polymers including ethylene homopolymers and/or ethylene-alpha olefin copolymers having a multimodal composition distribution and broad molecular weight distribution. Such polymer compositions may possess a plurality of crystallization peaks on a Crystallization Elution Fractionation (CEF) curve. The multimodal composition distribution and broad molecular weight distribution may confer the desired properties of tear resistance, puncture and dart drop impact, as well as improved processability, optical and sealing properties. Embodiments also include various processes for preparing such polymer compositions, namely: (i) physical mixture in the molten state of polyethylenes with different microstructural characteristics; (ii) combining different metallocene catalysts in the polymerization reactor and (iii) using multimetal catalysts in the polymerization process.

The ethylene-alpha-olefin copolymer fraction of the present disclosure typically are copolymers of ethylene with at least one $C_3$-$C_{20}$ alpha-olefin. Preferred comonomers include propene, 1-butene, 1-pentene, 1-hexene, 4-methylpentene, I-octene and 1-decene. The ethylene-alpha-olefin copolymer fraction of the present disclosure may contain a comonomer amount that may range from 0 to 30 wt %.

The amount of comonomer of the ethylene-alpha-olefin copolymer fraction is determined by $^{13}C$ NMR spectroscopy. $^{13}C$ NMR comonomer content and distributions are determined according by the methodology proposed by J. C. Randall et al., in "NMR and Macromolecules" ACS Symposium series 247 and J. C. Randall in "Polymer Sequence Determination", academic Press, New York (1977), which provide general methods of polymer analysis by NMR spectroscopy. All $^{13}C$ NMR experiments of the present disclosure were carried out on a Bruker 500 MHz spectrometer with a 10 mm DUAL (proton and carbon) cryoprobe at 130° C. for polymer samples.

The density of the ethylene polymer compositions (as measured in accordance with ASTM D-792) may range from 0.900 to 0.960 g/cm³ in one embodiment and from 0.900 to 0.940 g/cm³ in other embodiments.

The melt index of the polymer compositions of the present disclosure is measured according to ASTM D-1238, condition 190° C./2.16 kg (formerly known as "Condition (E)" and also known as 12). Melt index of the polymer compositions of the present disclosure may range from 0.001 to 20 g/10 min in one embodiment, and from 0.5 to 5 g/10 min in other embodiments.

The molecular weight of the ethylene-based polymer compositions of the present disclosure may have:
  a. a weight average molecular weight (Mw) in the range of 70-1000 kg/mol in one embodiment, and from 80-600 kg/mol in other embodiments;
  b. a number average molecular weight (Mn) in the range of 10-300 kg/mol in one embodiment, and from 20 to 200 kg/mol in other embodiments;
  c. an average z molecular weight (Mz) in the range of 200 to 10000 kg/mol;
  d. a molecular weight distribution in the range of 2.0 to 20 in one embodiment, and from 2 to 12 in other embodiments;
  e. a long chain branching (LCB) content in the range of 0 to 10 LCB/10,000 C.

The molecular weight of the polymers are determined by Gel permeation chromatography (GPC) using a Polymer Char GPC-IR® equipped with triple detector. Mw/Mn and Mw measurements are obtained using a viscosimetric detector with polymer solutions prepared in 1,2,4-trichlorobenzene (TCB) with 0.1 g/L of butylhydroxytoluene (BHT), and the analyses performed at 150° C. The molecular weights are determined using a calibrated curve obtained from a series of monodisperse polystyrene standards and narrow molar mass LLDPE and polypropylene. The measurement of long chain branching with 3D-GPC is based on the reduction of intrinsic viscosity and radius of gyration of a polymer chain with LCB when compared to a linear reference with the same molar mass. The difference in the slope of the Mark-Houwink plot (Log IV×Log M) and conformation plot (Log Rg×Log M) between the linear and the branched sample is directly related to the amount of LCB, as an effect of the more compact form assumed by the branched chains.

The polymer compositions disclosed herein have a CEF profile with more than one crystallization peak. In CEF analytical processes, samples are solubilized in oDCB (ortho dichlorobenzene) at a concentration of 4 to 6 mg/L. When the sample solution is injected into the CEF column, the crystallization cycle takes place (at a cooling rate of 2° C./min). Once the crystallization finishes, the elution cycle takes place, increasing the temperature of the column at the same time that a higher flow rate is applied (heating rate of 4° C./min). The sample is submitted to two separation processes and the results are detected during the elution cycle by the infrared detector, giving origin to the chemical composition distribution profile.

In one or more embodiments, the CEF profile exhibits at least two crystallization peaks over a wide range of temperature of 40 to 120° C. More specifically, in one or more embodiments, the CEF profile exhibits three or more crystallization peaks, in the following range of temperatures: 85 to 110° C. (Polyethylene A), 70 to 90° C. (Polyethylene B) and 40 to 75° C. (Polyethylene C).

In one or more embodiments, the multimodal ethylene alpha-olefin copolymer composition of the present disclosure, which can be prepared by the processes described herein, exhibits in the CEF profile, three or more crystallization peaks i.e., three polyethylene fractions (A, B and C). Each of the polyethylene fractions A, B and C has the following properties:

Polyethylene A—polyethylene having a comonomer content in the range of 0 to 10 wt %, weight average molecular weight (Mw) in the range of 70-1000 kg/mol, number average molecular weight (Mn) in the range of 10-300 kg/mol, Z average molecular weight (Mz) in the range of 200 to 10000 kg/mol and molecular weight distribution (Mw/Mn) in the range of 2 to 20. The long chain branching (LCB) content of this polyethylene is in the range 0 to 10 LCB/10000 C. In the CEF profile, this fraction presents crystallization peak with temperature ranging from 85 to 110° C.

Polyethylene B—polyethylene having a comonomer content in the range of 10 to 15 wt %, weight average molecular weight (Mw) in the range of 70-1000 kg/mol, number average molecular weight (Mn) in the range of 10-300 kg/mol, Z average molecular weight (Mz) in the range of 200 to 10000 kg/mol and molecular weight distribution (Mw/Mn) in the range of 2 to 20. The long chain branching (LCB) content of this polyethylene is in the range 0 to 10 LCB/10000 C. In the CEF profile, this fraction presents crystallization peak with temperature ranging from 70 to 90° C.

Polyethylene C—polyethylene having a comonomer content in the range of 15 to 40 wt %, weight average molecular weight (Mw) in the range of 70-1000 kg/mol, number average molecular weight (Mn) in the range of 10-300 kg/mol, Z average molecular weight (Mz) in the range of 200 to 10000 kg/mol and molecular weight distribution (Mw/Mn) in the range of 2 to 20. In the CEF profile, this fraction presents crystallization peak with temperature ranging from 40 to 75° C.

In one or more embodiments, the multimodal ethylene alpha-olefin copolymer composition of the present disclosure may be prepared by the physical melt blending of different types of polyethylene. In one embodiment of such process, the physical melt blending is carried out with at least three different polyethylenes, A, B and C. In this embodiment, the polyethylenes A, B and C are present in the blend in the ranges of 0 to 30, 0 to 60 and 0 to 80 wt %, respectively. In a more particular embodiment of such process, the polyethylenes A, B and C are present in the blend in the ranges of 10 to 20, 20 to 40 and 40 to 70 wt %, respectively.

Polyethylene A contributes to obtain a higher sealing force, better mechanical properties, such as greater modulus, higher strain in the flow, higher tensile strength, etc.

Polyethylene B, intermediate, also contributes to the sealing properties.

Polyethylene C contributes to the decrease in sealing temperature and initial sealing temperature (SIT), crystallization temperature and melting temperature.

In one or more embodiments, the present compositions may be prepared by the combination of different metallocene catalysts in a polymerization reactor. In this process, two or more catalysts with different comonomer responses may be used in ethylene polymerization or for the copolymerization of ethylene with alpha-olefins in a slurry or gas phase, with the use of one or more reactors.

As mentioned above, non-limiting examples of comonomers that may be used in process (ii) are propylene, propene, 1-butene, 1-hexene, 4-methyl-pentene, 1-octene and 1-decene.

The polymerization temperature used in process (ii) is in the range of 50 to 100° C.

The ethylene pressure used in process (ii) is between 1 and 100 bar.

The metallocene catalysts of process (ii) comprise a transition metal complex of group 4 or 5 of the periodic table, with or without bridge between the aromatic rings, immobilized on a silica bisupport and containing an alkyl-aluminium activator compound and/or a fluorinated activator.

The transition metal base metallocene of groups 4 or 5 of the periodic table is derived from a compound of formula 1:

(1)

where:

M is a transition metal of groups 4 or 5;

L, which may be the same or different, may be selected from: halogen radical, aryl radical, alkyl radical containing from 1 to 5 carbon atoms or alkoxy radical containing from 1 to 5 carbon atoms; and Q is a bulky ligand, such as cyclopentadienyl, indenyl or fluorenyl type, which may be unsubstituted or substituted by hydrogen, alkyl, cycloalkyl, aryl, alkenyl, arylalkyl, arylalkyl or arylalkenyl, coordinated to metal M.

R is a bridging group between the bulky ligands Q.

Further, when n is equal to 1, the metallocene has a bridge R between the bulky ligands Q, and when n is equal to zero, the metallocene does not have the bridge R.

Representative but non-limiting examples of compounds having the formula 1 include: bis(cyclopentadienyl)zirconium dimethyl, bis(cyclopentadienyl)zirconium dichloride, bis(dimethylcyclopentadienyl)zirconium dichloride, bis(methylethylcyclopentadienyl)zirconium dichloride, bis (methyl-n-propylcyclopentadienyl)zirconium dichloride, bis (methyl-n-butylcyclopentadienyl)zirconium dichloride, bis (cyclopentadienyl)zirconium monomethylmonochloride, bis (cyclopentadienyl)titanium dichloride, bis (cyclopentadienyl)titanium difluoride, cyclopentadienylzirconium tri-(2-ethylhexanoate), bis(cyclopentadienyl)zirconium hydrogen chloride, bis(cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, (η5-indenyl)hafnium trichloride, racemic dimethylsilanylene-bis (4,7-dimethyl-1-indenyl)zirconium dichloride, racemic dimethylsilanylene-bis(indenyl)uranium dichloride, racemic dimethylsilanylene-bis(2,3,5-trimethyl-1-cyclopentadienyl) zirconium dichloride, racemic dimethylsilanylene(3-methylcyclopentadienyl)hafnium dichloride, racemic dimethylsilanylene-bis(1-(2-methyl-4-ethylindenyl zirconium dichloride; racemic dimethylsilanylene-bis(2-methyl-4,5,6, 7-tetrahydro-1-indenyl)zirconium dichloride, bis(pentamethylcyclopentadienyl)thorium dichloride, bis(pentamethylcyclopentadienyl)uranium dichloride, (tert-butylamide) dimethyl(tetramethyl-η5-cyclopentadienyl)silanetitanium dichloride, (tert-butylamide)dimethyl(tetramethyl-η5-cyclopentadienyl)silanechromium dichloride, (tert-butylamide)dimethyl(-η5-cyclopentadienyl)silanetitanium dichloride, (tert-butylamide)(tetramethyl-η5-cyclopentadienyl)-1, 2-ethanediyluranium dichloride, (tert-butylamide) (tetramethyl-η5-cyclopentadienyl)-1,2-ethanediyltitanium dichloride, (methylamido)(tetramethyl-η5-cyclopentadienyl)-1,2-ethanediylcerium dichloride(methylamido)(tetramethyl-η5-cyclopentadienyl) 1,2-ethanediyltitanium dichloride, (ethylamido)(tetramethyl-η15-cyclopentadienyl) methylenetitanium dichloride, (tert-butylamide)dibenzyl(tetramethyl-η5 cyclopentadienyl)silanebenzylvanadium chloride, (benzylamido)dimethyl(indenyl)silanetitanium dichloride, and (phenylphosphido)dimethyl(tetramethyl-η5-cyclopentadienyl)silanebenzyl-titanium chloride, racemic [1,1'-dimethylsilanylene-bis(3-methylcyclopentadienyl)] zirconium dichloride; [1,1'-dimethylsilanylene-bis(indenyl)] zirconium dichloride; [1,1'-dimethylsilanylene-bis(4,5,6,7-tetrahydroindenyl)] zirconium dichloride; [1,1'-(1,1,2,2-tetramethyldisilanylene)-bis(3-methylcyclopentadienyl)] zirconium dichloride; [1,1'-(1,1,2,2-tetramethyldisilanylene)-bis(4,5,6,7-tetrahydroindenyl)] zirconium dichloride; [1,1'-dimethylsilanylene-bis(3-trimethylsilanylcyclopentadieny)] zirconium dichloride; [1,1'-(1,1,2,2-tetramethyldisilanylene)-bis(3trimethylsilanylcyclopentadienyl)]zirconium dichloride; [1,1'-(1,1,3,3-tetramethyldisiloxanylene)-bis(4, 5,6,7-tetrahydroindenyl)] zirconium dichloride; [1,1'-(1,1,4, 4-tetramethyl-1,4-disilanylbutylene)-bis(4,5,6,7-tetrahydroindenyl)] zirconium dichloride; [1,1'-(2,2-dimethyl-2-silapropylene)-bis(3-methylcyclopentadienyl)] zirconium dichloride.

In one or more embodiments, in the metallocene catalysts used in such process, the transition metal content of group 4 or 5 of the periodic table may range from 0.1 to 20 wt %.

The silica bisupport may comprise a silica containing on its surface a metal-containing compound of groups 2, 6, 12 or 13 of the periodic table. Representative, but not limiting, examples of the metal containing compound of groups 2 or 6 or 12 or 13 of the periodic table include $MgCl_2$, $MgF_2$, $(MoCl_5)_2$, $ZnCl_2$ and $AlCl_3$. Further, the content of the metal-containing compound of groups 2, 6, 12 or 13 of the periodic table on the surface of the silica may range from 0.1 to 20 wt %.

Non-limiting examples of the alkylaluminum activator compound of the present invention include trimethylaluminum (TMAL), triethylaluminum (TEAL), triisobutylaluminum (TIBAL), tri-n-hexylaluminum (TNHAL), tri-n-octyl-aluminum (TNOAL), dimethylaluminum chloride DMAC), methylaluminium dichloride (MADC), diethylaluminum chloride (DEAC), ethylaluminum dichloride (EADC), diisobutylaluminum chloride (DIBAC), isobutylaluminium dichloride (MONIBAC), methylaluminoxane (MAO). Non-limiting examples of fluorinated activators are HF, $MgF_2$, $(NH_4)_3AlF_6$, $NH_4HF_2$, NaF, KF, $NH_4F$, $(NH_4)_2SiF_6$. In the metallocene catalysts used in such process, the content of alkylaluminum or fluorinated compound may range from 0.1 to 40 wt %.

In one or more embodiments, the process for obtaining the supported metallocene catalysts used in the process for preparing the polymer compositions of the present disclosure includes:
1) React the silica bisupport with the alkylaluminium activator compound and/or the fluorinated activator;
2) React the product of step (1) with the transition metal base metallocene of groups 4 or 5 of the periodic table.

Alternatively, the process for obtaining the supported metallocene catalysts used in the process for preparing the polymer compositions of the present disclosure includes:
1) React the transition metal base of groups 4 or 5 of the periodic table with the alkylaluminium activator compound and/or the fluorinated activator;
2) React the product of step (1) with silica bisupport In particular embodiments, the preparation process for obtaining transition metal base supported metallocene catalysts from groups 4 or 5 of the periodic table comprises the following steps:
1) Reaction of the silica bisupport with a solution of alkylaluminum activator compound in an inert organic solvent and/or with a fluorinated activator in acid solvent or mixture of acidic or gas phase solvents.
2) Reaction of the product obtained in (1) with a transition metal base metallocene solution of groups 4 or 5 of the periodic table in an inert organic solvent; and
3) Washing and solvent removal of the reaction product obtained in (2).

In such step (1) of the process for obtaining the supported metallocene catalysts used in the process for preparing the polymer compositions of the present disclosure, impregnation of the silica bisupport with a solution of the alkylaluminum activator compound in inert organic solvent and/or with a fluorinated activator in an acid solvent or acid solvent mixture.

Non-limiting examples of alkylaluminum activators that can be used in step (1) include trimethylaluminum (TMAL), triethylaluminum (TEAL), triisobutylaluminum (TIBAL), tri-n-hexylaluminum (TNHAL), tri-Dimethylaluminum chloride (DMAC), methyl aluminum dichloride (MADC), diethylaluminum (DEAC), ethylaluminum dichloride (EADC), diisobutylaluminum chloride (DIBAC), isobutylaluminum dichloride (MONIBAC), methylaluminoxane (MAO). The amount of alkylaluminum activator that may be used is comprised between 0.1 and 40% by weight of Al in relation to the silica bisupport.

Non-limiting examples of inert organic solvents, which may be used for solubilizing the alkylaluminum activator, are toluene, cyclohexane, n-hexane, n-heptane and n-octane and/or mixtures thereof.

In the steps (1) and (2), sufficient amount of solvent is used to suspend the material.

The reaction time of step (1) should be in the range from 0.1 h to 24 h, preferably from 0.5 h to 6 h. The reaction temperature of step (1) is between −10° C. and 90° C., preferably between 30 and 80° C.

Non-limiting examples of fluorinated activator compounds that may be used in step (1) include: HF, $MgF_2$, $(NH_4)_3AlF_6$, $NH_4HF_2$, NaF, KF, $NH_4F$, $(NH_4)_2SiF_6$. The amount of fluorinated activator that may be used is from 0.1 to 20%, preferably from 2 to 10% by weight of F relative to the silica bisupport. Non-limiting examples of acidic solvents that may be used for solubilizing the fluorinated activator compound in step (1) are: $HNO_3$, HCl, $H_2SO_4$, which may be used neat or mixed, in their concentrated forms, or as aqueous solutions in any proportions.

Step (2) of the process for the preparation of the supported metallocene catalysts includes reacting the product obtained in (1) with a metallocene solution based on Transition metal of groups 4 or 5 of the periodic table in an inert organic solvent.

The transition metal base metallocene of groups 4 or 5 of the periodic table used in step (2) is derived from a compound of formula 1:

where:
M is a transition metal of groups 4 or 5;
L, which may be the same or different, is selected from: halogen radical, aryl radical, alkyl radical containing from 1 to 5 carbon atoms or alkoxy radical containing from 1 to 5 carbon atoms; and
Q is a bulky ligand such as cyclopentadienyl, indenyl or fluorenyl type, which may be unsubstituted or substituted by hydrogen, alkyl, cycloalkyl, aryl, alkenyl, arylalkyl, arylalkyl or arylalkenyl, coordinated to metal M.
R is a bridging group between the bulky ligands Q. When n is equal to 1, the metallocene has a bridge R between the bulky ligands Q and when n is equal to zero, the metallocene does not have the bridge R.

Representative but non-limiting examples of compounds having the formula 1 include: bis(cyclopentadienyl)zirconium dimethyl, bis(cyclopentadienyl)zirconium dichloride, bis(dimethylcyclopentadienyl)zirconium dichloride, bis(m-ethylethylcyclopentadienyl)zirconium dichloride, bis(methyl-n-propylcyclopentadienyl)zirconium dichloride, bis(methyl-n-butylcyclopentadienyl)zirconium dichloride, bis(cyclopentadienyl)zirconium monomethylmonochloride, bis(cyclopentadienyl)titanium dichloride, bis(cyclopentadienyl)titanium difluoride, cyclopentadienylzirconium tri-(2-ethylhexanoate), bis(cyclopentadienyl)zirconium hydrogen chloride, bis(cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, (η5-indenyl)hafnium trichloride, racemic dimethylsilanylene-bis (4,7-dimethyl-1-indenyl)zirconium dichloride, racemic dimethylsilanylene-bis(indenyl)uranium dichloride, racemic-dimethylsilanylene-bis(2,3,5-trimethyl-1-cyclopentadienyl) zirconium dichloride, racemic-dimethylsilanylene(3-methylcyclopentadienyl)hafnium dichloride, racemic dimethylsilanylene-bis(1-(2-methyl-4-ethylindenyl zirconium dichloride; racemic dimethylsilanylene-bis(2-methyl-4,5,6,7-tetrahydro-1-indenyl)zirconium dichloride, bis(pentamethylcyclopentadienyl)thorium dichloride, bis (pentamethylcyclopentadienyl)uranium dichloride, (tert-butylamide)dimethyl(tetramethyl-η5-cyclopentadienyl) silanetitanium dichloride, (tert-butylamide)dimethyl (tetramethyl-η5-cyclopentadienyl)silanechromium dichloride, (tert-butylamide)dimethyl(-η5-cyclopentadienyl)silanetitanium dichloride, (tert-butylamide)(tetramethyl-η5-cyclopentadienyl)-1,2-ethanediyluranium dichloride, (tert-butylamide)(tetramethyl-η5-cyclopentadienyl)-1,2-ethanediyltitanium dichloride, (methylamido)(tetramethyl-η5-cyclopentadienyl)-1,2-ethanediylcerium dichloride, (methylamido)(tetramethyl-η5-cyclopentadienyl) 1,2-ethanediyltitanium dichloride, (ethylamido)(tetramethyl-η5-cyclopentadienyl)methylenetitanium dichloride, (tert-butylamide)dibenzyl(tetramethyl-η5-cyclopentadienyl)silanebenzylvanadium chloride, (benzylamido)dimethyl(indenyl)silanetitanium dichloride, and (phenylphosphido)dimethyl(tetramethyl-η5-cyclopentadienyl)silanebenzyl-titanium chloride, racemic [1,1'-dimethylsilanylene-bis(3-methylcyclopentadienyl)] zirconium dichloride; [1,1'-dimethylsilanylene-bis(indenyl)] zirconium dichloride; [1,1'-dimethylsilanylene-bis(4,5,6,7-tetrahydroindenyl)] zirconium dichloride; [1,1'-(1,1,2,2-tetramethyldisilanylene)-bis(3-methylcyclopentadienyl)] zirconium dichloride; [1,1'-(1,1,2,2-tetramethyldisilanylene)-bis(4,5,6,7-tetrahydroindenyl)] zirconium dichloride; [1,1'-dimethyl-silanylene-bis(3-trimethylsilanylcyclopentadieny)] zirconium dichloride; [1,1'-(1,1,2,2-tetramethyldisilanylene)-bis(3 trimethylsilanylcyclopentadienyl)]zirconium dichloride; [1,1'-(1,1,3,3-tetramethyldisiloxanylene)-bis(4,5,6,7-tetrahydroindenyl)] zirconium dichloride; [1,1'-(1,1,4,4-tetramethyl-1,4-disilanylbutylene)-bis(4,5,6,7-tetrahydroindenyl)] zirconium dichloride; [1,1'-(2,2-dimethyl-2-silapropylene)-bis(3-methylcyclopentadienyl)] zirconium dichloride.

Non-limiting examples of inert organic solvents which may be used for solubilizing the metallocene in step (2) are: toluene, cyclohexane, n-hexane, n-heptane, n-octane and/or mixture thereof.

The amount of said metallocene which may be used in the present process is comprised between 0.1 to 20 wt % of metal relative to the silica bisupport, preferably 0.1 to 2%.

The reaction temperature should be in the range of 0 to 60° C., preferably between 10 to 30° C. The reaction time should be in the range of 0.1 h to 24 h, preferably 0.5 to 4 h.

Step (3) of the process for obtaining the supported metallocene catalysts used in the process comprises washing and removing the solvent contained in the reaction product obtained in (2) under reduced pressure or with the use of nitrogen gas flow.

Washing of the supported metallocene obtained in step (2) is carried out with sufficient amount of organic solvent. The wash temperature may range from room temperature to 90° C.

In the above described process, the metallocene catalysts may be added in the same polymerization reactor or in separate reactors.

In one or more embodiments, it is also envisioned that the polymer compositions may be obtained from a third type of process. In such third process, the multimodal ethylene-based polymer compositions of the present disclosure may be prepared by the use of multimetal catalyst in the polymerization process.

The polymerization conditions in this third process are similar to those described in the second process described above. However, the third process differs from the second process by the nature of the catalyst system. While the second process makes use of two or more metallocene catalysts in the homopolymerization of ethylene or copolymerization of ethylene with alpha-olefins, the third process utilizes multimetal catalysts.

The multimetal catalysts used in the third process are comprised of two or more transition metal complexes of group 4 or 5 of the periodic table, with or without bridge between the aromatic rings, immobilized on the same support or silica bisupport and containing an alkylaluminum activator compound or a fluorinated activator. The transition metals in the two complexes may be different.

The conditions of preparation of the multimetal catalysts used in the third process are similar to those used for the catalysts used in the second process, except for the presence of two additional steps, steps (4) and (5).

In the preparation stage (4) of the multimetal catalysts of the third process, the product obtained in (3) is reacted with a metallocene metal transition solution of groups 4 or 5 of the periodic table in an inert organic solvent. It should be noted that the metallocene chosen should be different (with a different metal) from that used in step (2), but also has formula 1.

In order to obtain the copolymer of ethylene with alpha-olefins with multimodal distribution of composition and large molecular weight distribution of the present invention by this third process, metallocene complexes with different comonomer responses on the support or base bisupport of silica may be used.

The molar ratio of the two different metallocenes used in step (1) and step (5) may be in the range of 1:1 to 1:5.

The solvent and the other reaction conditions of step (4) may be identical to those used in step (2).

Step (5) of the process for obtaining the supported metallocene catalysts used in the third process for preparing the polymer compositions of the present disclosure comprises washing and removing the solvent contained in the reaction product obtained in (4) under reduced pressure or with the use of nitrogen gas flow.

Washing of the multimetal catalyst obtained in step (4) may be carried out with sufficient amount of organic solvent. The wash temperature may range from room temperature to 90° C.

Any conventional ethylene (co)polymerization reaction may be employed to produce the polymer composition. Such conventional ethylene (co)polymerization reactions include, but are not limited to, slurry phase polymerization process, solution phase polymerization process, and combinations thereof using one or more conventional reactors, e.g., loop reactors, stirred tank reactors, batch reactors in parallel, series, and/or any combinations thereof. In one embodiment, the polymerization reactor may comprise two or more reactors in series, parallel, or combinations thereof. In one embodiment, the polymerization reactor is one reactor.

Films prepared from the compositions of the present disclosure may exhibit one or more of the following sealing properties:

a. Heat Seal Sealing initial temperature (SIT) in the range of 60 to 100° C., measured according to ASTM F-2029;
b. Heat Seal Sealing Temperature in the range of 80 to 125° C., measured according to ASTM F-2029;
c. Heat Seal Average Sealing Strength in the range of 4 to 30 N, measured according to ASTM F-2029;
d. Heat Seal Maximum Sealing Strength in the range of 7 to 40 N, measured according to ASTM F-2029;
e. Hot Tack Sealing Temperature in the range of 80 to 125° C., measured according to ASTM F-1921;
f. Hot Tack Sealing Strength in the range of 1 to 6 N, measured according to ASTM F-1921.

In addition to the aforementioned sealing properties, the multimodal composition distribution in combination with the other microstructural characteristics of the ethylene alpha-olefin copolymers of the present disclosure may also result in benefits to other film properties such as tear resistance, puncture and dart drop impact, as well as improved processability and better optical properties.

In one or more embodiments, films prepared with the multimodal ethylene polymer compositions of the present disclosure, may have one or more of the following properties:
a. a normalized machine direction Elmendorf tear strength of at least 230 gF and a normalized cross direction Elmendorf tear strength of at least 800 gF, both measured according to ASTM D-1922;
b. a Dart Drop Impact measured according to ASTM D-1709 of at least 250 gF;
c. a Maximum Puncture force at break measured according to ASTM F-1306 of at least 15 N;
d. a normalized machine direction Tensile Modulus (1% Secant) of at least 60 MPa and a normalized cross direction Tensile Modulus (1% Secant) of at least 60 MPa, both measured according to ASTM D-882;
e. a normalized machine direction Tensile Strength at Break of at least 20 MPa and a normalized cross direction Tensile Strength at Break of at least 16 MPa, both measured according to ASTM D-882;
f. a normalized machine direction Tensile Elongation at Break (1% Secant) of at least 500% and a normalized cross direction Tensile Elongation at Break (1% Secant) of at least 760%, both measured according to ASTM D-882;
g. 45° Gloss (optical property) measured according to ASTM D-2457 of at least 85%;
h. Clarity (optical property) measured according to ASTM D-1003 of at least 95%;
i. Haze (optical property) measured according to ASTM D-1003 of less than 8%.

Films include blown or cast films formed by co-extrusion or by lamination useful as shrink film, cling film, stretch film, sealing film, oriented film, snack packaging, heavy duty bags, grocery sacks, baked and frozen food packaging, medical packaging, industrial liners, agricultural film applications, and membranes, for example, in food-contact and non-food-contact applications. It is also envisioned that the polymer compositions may also be used in sheet, pipe and fiber extrusion and co-extrusion as well as blow molding, injection molding and rotary molding.

In another embodiment, the polymer compositions may be form a cast film, including a monolayer film or multilayer film. A monolayer film may have a thickness, for example, from 0.25 to 10 mils, including all individual values and subranges within 0.25 to 10 mils. In a multilayer film, at least one layer includes the cast film of the present polymer compositions. In such multi-layer film, the present film may have a thickness from 0.1 to 8 mils, including all individual values and subranges within 0.1 to 8 mils.

The following examples are presented to provide a better understanding of the compositions of the present disclosure and of the improvements achieved, which should not be considered limitative of the scope and reach of the present disclosure.

Inventive Ethylene Alpha-Olefin Polymer Compositions (Inventive Examples 1-3)

In the following examples, microstructural characteristics and film properties are presented for three different ethylene-alpha-olefin copolymers, prepared by melt polymer blending process. These ethylene-alpha-olefin copolymers were designated as Example 1-3. Table 1 lists the microstructural characteristics of the materials used for preparing Examples 1-3 by melt polymer blending process.

TABLE 1

| Fraction | I2 (g/10 min) | Density (g/cm$^3$) | Comonomer type | Comonomer content (% wt) | Mw/Mn | Mw (kg/mol) | Mz (kg/mol) |
|---|---|---|---|---|---|---|---|
| Polyethylene A1 | 1.0 | 0.960 | 1-hexene | 0.9 | 8.7 | 123 | 291 |
| Polyethylene A2 | 1.0 | 0.933 | 1-hexene | 2.8 | 4.7 | 94 | 213 |
| Polyethylene A3 | 1.0 | 0.920 | 1-hexene | 7.5 | 4.8 | 148 | 515 |
| Polyethylene B | 1.0 | 0.918 | 1-hexene | 7.9 | 3.3 | 108 | 323 |
| Polyethylene C | 1.0 | 0.905 | 1-hexene | 13.6 | 2.4 | 118 | 217 |

Example 1 an ethylene alpha-olefin copolymer composition containing 60 wt % of Polyethylene A3+20 wt % of Polyethylene B+20 wt % of Polyethylene C.

Example 2 an ethylene alpha-olefin copolymer composition with 25 wt % of Polyethylene A2+35 wt % of Polyethylene B+40 wt % of Polyethylene C.

Example 3 an ethylene alpha-olefin copolymer composition with 12 wt % of Polyethylene A1+38 wt % of Polyethylene B+50 wt % of Polyethylene C.

Figure 1:
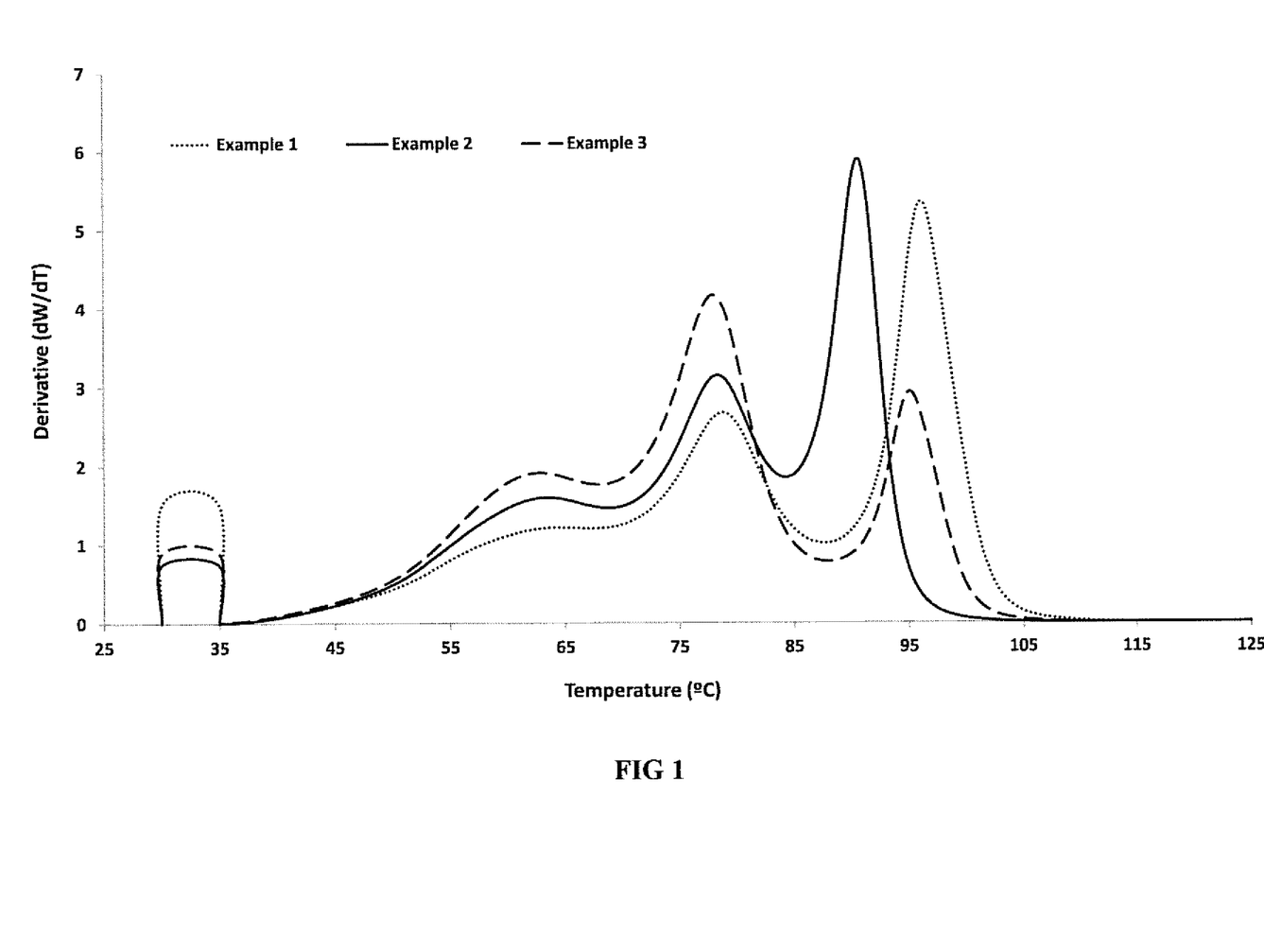
FIG. 1 shows the CEF profiles for Examples 1, 2 and 3 of the polymer compositions of the present disclosure.

FIG. 1 shows CEF profiles of the ethylene alpha-olefin copolymers of Examples 1-3 of the present disclosure.

According to FIG. 1 the ethylene alpha-olefin copolymers compositions of these examples present three peaks in the range of 35 to 110° C., evidencing their multimodal composition distribution.

that Example 3 shows lower SIT and higher sealing force than Comparative A. Regarding optical properties, Examples 1, 2 and 3 show lower haze than Comparative A and B.

TABLE 2

| | Material | Example 1 | Example 2 | Example 3 | Comparative A | Comparative B |
|---|---|---|---|---|---|---|
| Basic Characterization | I2 | 1.0 | 1.0 | 1.0 | 1.0 | 1.0 |
| | Density (g/cm$^3$) | 0.918 | 0.918 | 0.918 | 0.918 | 0.918 |
| GPC-IR5 | Mn (kg/mol) | 31 | 27 | 31 | 26 | 50 |
| | Mw (kg/mol) | 131 | 105 | 112 | 111 | 140 |
| | Mz (kg/mol) | 392 | 213 | 220 | 275 | 350 |
| | Mw/Mn | 4.15 | 3.89 | 3.63 | 4.24 | 2.9 |
| | IV (dL/g) | 2.02 | 1.78 | 1.86 | 1.81 | n.a. |
| $^{13}$C NMR | Comonomer content (wt %) | 9.0 | 9.0 | 9.7 | 10.6 | 8.3 |
| Sealing Properties HOT TACK | Sealing Temperature (° C.) | 120 | 115 | 115 | 120 | n.a. |
| | Sealing Force (N) | 3.4 | 3.6 | 4.3 | 2.6 | n.a. |
| Sealing Properties HEAT SEAL | Average Sealing Force (N) | 10.7 | 10.9 | 13.5 | 13.5 | n.a. |
| | Max Sealing Force (N) | 14.8 | 15.3 | 19.2 | 17.9 | n.a. |
| | Sealing Temperature (° C.) | 120 | 115 | 110 | 110 | n.a. |
| | SIT (° C.) | 93 | 92 | 77 | 86 | n.a. |
| Optical Properties | Haze (%) | 6.3 | 7.1 | 5.3 | 7.4 | 8.0 |
| | Gloss @ 45 degrees | 85 | 76 | 86 | 83 | 91 |
| | Internal Haze (%) | 4.2 | 3.1 | 2.4 | 3.2 | n.a. |
| | Clarity (%) | 95 | 96 | 95 | 97 | n.a. |
| Elmendorf Tear | MD (gF) | 240 | 250 | 330 | 350 | 380 |
| | CD (gF) | 930 | 850 | 810 | 930 | 1055 |

Figure 2:
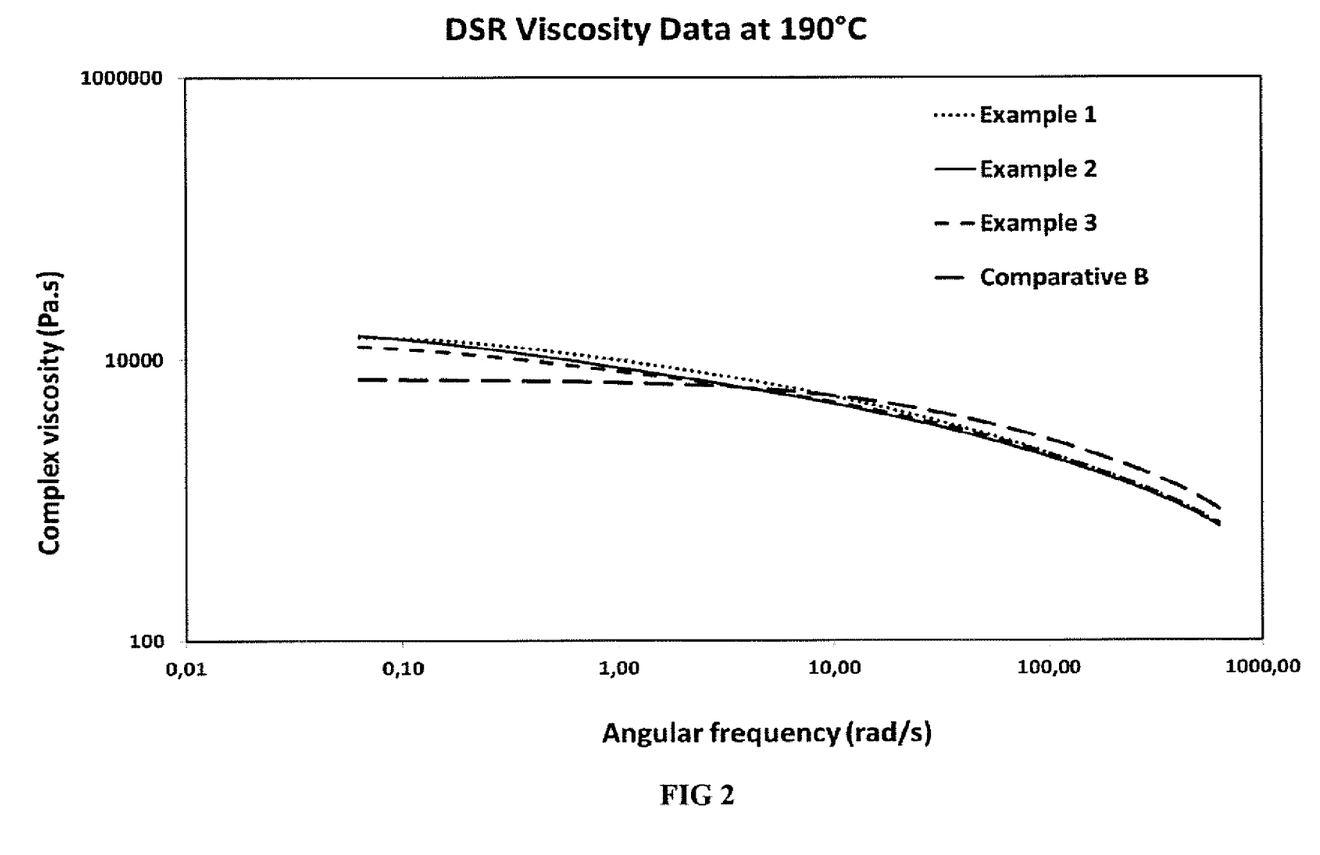
FIG. 2 shows a representation of Complex viscosity at 190° C. versus frequency for Examples 1, 2 and 3 of the present disclosure and Comparative B.

FIG. 2 shows a graph illustrating the Complex viscosity at 190° C. versus frequency for Examples 1, 2 and 3 of the present disclosure along with Comparative B (Flexus® 9211 by Braskem). It is possible to observe in FIG. 2 that the viscosity from Examples 1-3 decrease faster with shear rate than the reference, Comparative B. This flow behavior guarantees better processing capabilities from Examples 1-3 than Comparative B.

Films from Example 1, Example 2, Example 3, Comparative A (Elite® MG5401 by Dow Company) and Comparative B were prepared at a OCS ME-20/2800-V3 cast film extruder with a film thickness of 40 um.

Figure 3:
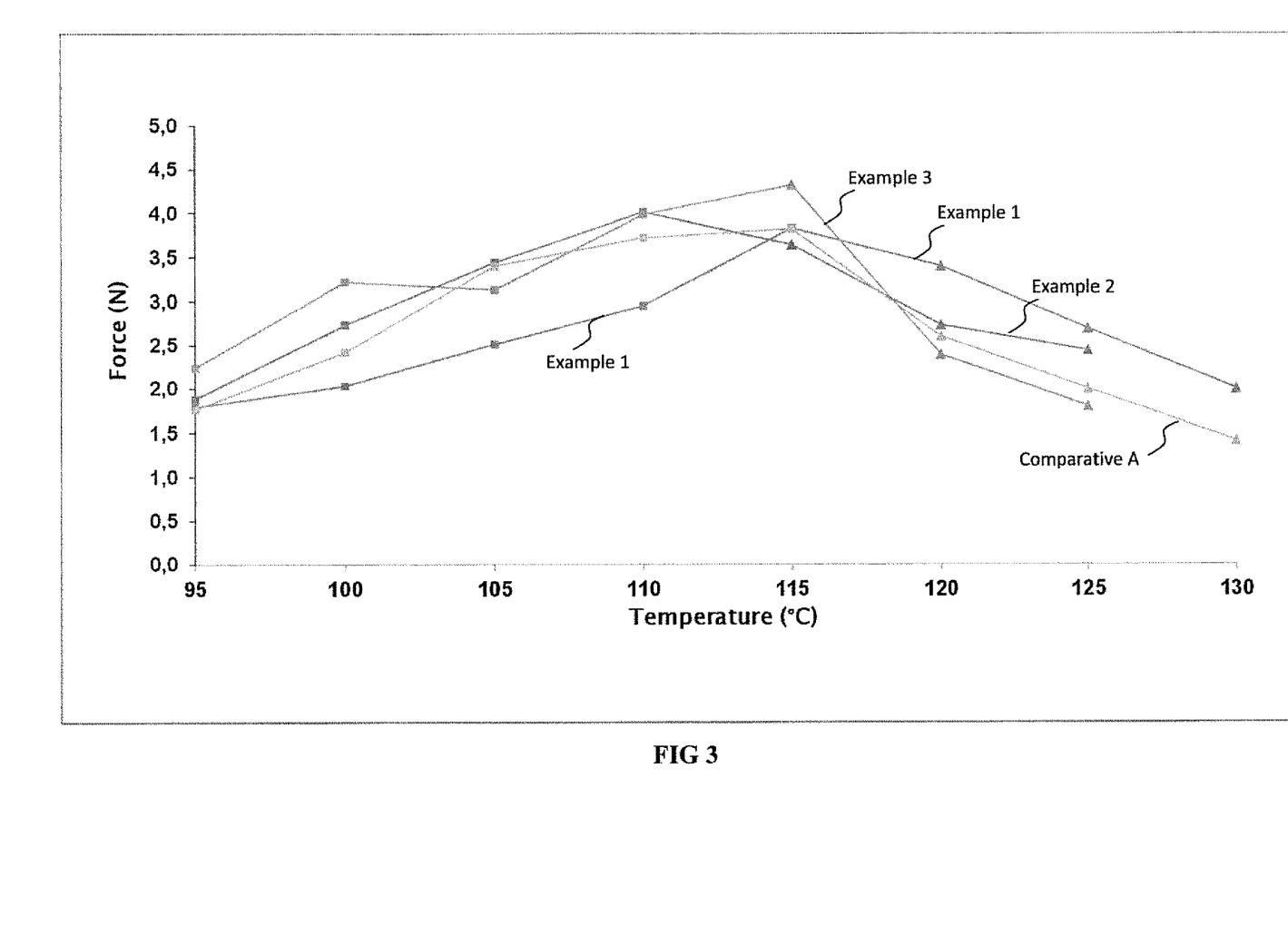
FIG. 3 shows a representation of Hot Tack strength as a function of temperature for Examples 1, 2 and 3 of the present disclosure and Comparative A.

FIG. 3 shows the hot tack strength versus sealing temperature curves of the polyethylene samples, in which the initial sealing temperature of each sample is indicated by the first triangle that appears in each curve. Comparative A is a commercial LLDPE used as reference since it is considered benchmarking in sealing properties. It is possible to observe that Example 2 and Example 3 showed better sealing performance than the Comparative A and Example 1, more specifically, higher hot tack strength and lower sealing temperature than Comparative A.

Some microstructural characteristics and film properties of Examples 1, 2 and 3 of the present disclosure and two commercial LLDPE references are shown in Table 2. Comparative A is a commercial LLDPE considered benchmarking in sealing properties and Comparative B is a commercial LLDPE considered benchmarking in optical properties. Regarding heat sealing properties, it is possible to observe Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:
1. A polymer composition, comprising:
   a plurality of ethylene-based polymers forming a multimodal composition distribution, each having a distinct crystallization peak in a Crystallization Elution Fractionation (CEF) curve, and
   wherein the distinct crystallization peaks comprise at least two peaks in a range of 40 to 110° C.
2. The polymer composition of claim 1, wherein the at least two peaks are in the range of 40 to 75° C. and 85 to 110° C.

3. The polymer composition of claim 2, further comprising a third peak in the range of 70 to 90° C.

4. The polymer composition of claim 1, wherein the plurality of ethylene-based polymers comprises two or more of:
- a first polyethylene having an alpha-olefin comonomer content ranging from 0 to 10 wt %;
- a second polyethylene having an alpha-olefin comonomer content ranging from 10 to 15 wt %; and
- a third polyethylene having an alpha-olefin comonomer content ranging from 15 to 40 wt %.

5. The polymer composition of claim 4, wherein the first polyethylene is present in an amount ranging from 0 to 30 wt %, the second polyethylene is present in an amount ranging from 0 to 60 wt %, and the third polyethylene is present in an amount ranging from 0 to 80 wt %.

6. The polymer composition of claim 5, wherein the first polyethylene is present in an amount ranging from 10 to 20 wt %, the second polyethylene is present in an amount ranging from 20 to 40 wt %, and the third polyethylene is present in an amount ranging from 40 to 70 wt %.

7. The polymer composition of claim 4, wherein each of the first polyethylene, the second polyethylene, and the third polyethylene have:
- a weight average molecular weight (Mw) ranging from 70-1000 kg/mol;
- a number average molecular weight (Mn) ranging from 10-300 kg/mol; and
- a Z average molecular weight ranging (Mz) from 200 to 10000 kg/mol.

8. The polymer composition of claim 1, wherein each of a first polyethylene, a second polyethylene, and a third polyethylene have a molecular weight distribution in the range of 2.0 to 20.

9. The polymer composition of claim 1, wherein the composition has a density in the range of 0.900 to 0.960 g/cm3 measured in accordance with ASTM D-792 and a Melt Index I2 in the range of 0.001 to 20 g/10 min.

10. The polymer composition of claim 1, wherein the composition has:
- a weight average molecular weight (Mw) ranging from 70-1000 kg/mol;
- a number average molecular weight (Mn) ranging from 10-300 kg/mol; and
- a Z average molecular weight ranging (Mz) from 200 to 10000 kg/mol.

11. The polymer composition of claim 1, wherein the composition has molecular weight distribution in the range of 2.0 to 20.

12. A film comprising the polymer composition of claim 1.

13. The film of claim 12, wherein the film has at least one selected from:
- a Heat Seal Sealing initial temperature (SIT) in the range of 60 to 100° C., measured according to ASTM F-2029;
- a Heat Seal Sealing Temperature in the range of 80 to 125° C., measured according to ASTM F-2029;
- a Heat Seal Average Sealing Strength in the range of 4 to 30 N, measured according to ASTM F-2029;
- a Heat Seal Maximum Sealing Strength in the range of 7 to 40 N, measured according to ASTM F-2029;
- a Hot Tack Sealing Temperature in the range of 80 to 125° C., measured according to ASTM F-1921; and
- a Hot Tack Sealing Strength in the range of 1 to 6 N, measured according to ASTM F-1921.

14. The film of claim 12, wherein the film has at least one selected from:
- a normalized machine direction Elmendorf tear strength of at least 230 gF and a normalized cross direction Elmendorf tear strength of at least 800 gF, both measured according to ASTM D-1922;
- a Dart Drop Impact measured according to ASTM D-1709 of at least 250 gF;
- a Maximum Puncture force at break measured according to ASTM F-1306 of at least 15 N;
- a normalized machine direction Tensile Modulus (1% Secant) of at least 60 MPa, measured according to ASTM D-882;
- a normalized cross direction Tensile Modulus (1% Secant) of at least 60 MPa, measured according to ASTM D-882;
- a normalized machine direction Tensile Strength at Break of at least 20 MPa, measured according to ASTM D-882;
- a normalized cross direction Tensile Strength at Break of at least 16 MPa, measured according to ASTM D-882;
- a normalized machine direction Tensile Elongation at Break (1% Secant) of at least 500%, measured according to ASTM D-882;
- a normalized cross direction Tensile Elongation at Break (1% Secant) of at least 760%, measured according to ASTM D-882;
- a 45° Gloss measured according to ASTM D-2457 of at least 85%;
- a Clarity measured according to ASTM D-1003 of at least 95%; and
- a Haze measured according to ASTM D-1003 of less than 8%.

15. The film of claim 12, wherein the film is multi-layer and at least one layer of the film is formed from the polymer composition.

16. A process of making a polymer composition, comprising:
melt blending a plurality of polyethylenes with different microstructural characteristics in the molten state, wherein the plurality of polyethylenes form a multimodal composition distribution, each having a distinct crystallization peak in a Crystallization Elution Fractionation (CEF) curve, and wherein the distinct crystallization peaks comprise at least two peaks in a range of 40 to 110° C.

17. The process of claim 16, wherein the plurality of polyethylenes has a multimodal composition distribution.

18. The process of claim 17, wherein the plurality of polyethylenes comprise two or more of:
- a first polyethylene having an alpha-olefin comonomer content ranging from 0 to 10%;
- a second polyethylene having an alpha-olefin comonomer content ranging from 10 to 15 wt %; and
- a third polyethylene having an alpha-olefin comonomer content ranging from 15 to 40 wt %.

19. A process of making a polymer composition, comprising:
polymerizing ethylene and an optional alpha olefin in combination with a plurality of metallocene catalysts in a polymerization reactor to form a plurality of ethylene based polymers, wherein the plurality of ethylene-based polymers form a multimodal composition distribution, each having a distinct crystallization peak in a Crystallization Elution Fractionation (CEF) curve, and wherein the distinct crystallization peaks comprise at least two peaks in a range of 40 to 110° C.

20. The process of claim 19, wherein the metallocene catalyst comprises a transition metal complex of group 4 or 5, with or without a bridge between aromatic rings, immobilized on a silica bisupport and containing an alkylaluminium activator compound and/or a fluorinated activator.

21. The process of claim 19, wherein the metallocene catalysts are derived from a compound of formula 1:

where

M is a transition metal of groups 4 or 5;

L, which is the same or different, comprises: halogen radical, aryl radical, alkyl radical containing from 1 to 5 carbon atoms or alkoxy radical containing from 1 to 5 carbon atoms;

Q is a bulky ligand coordinated to metal M and optionally substituted with hydrogen, alkyl, cycloalkyl, aryl, alkenyl, arylalkyl, arylalkyl or arylalkenyl; and R is a bridging group between the bulky ligands Q, wherein, when n is equal to 1, the metallocene has a bridge R between the bulky ligands Q and when n is equal to zero, the metallocene does not have the bridge R.

22. The process of claim 19, wherein the plurality of metallocene catalysts are added in the same polymerization reactor.

23. The process of claim 19, wherein the plurality of metallocene catalysts are added in different polymerization reactors.

24. The process of claim 19, further comprising:

reacting a silica bisupport with transition metal base metallocene catalysts from groups 4 or 5;

reacting an alkylaluminum activator compound and/or a fluorinated activator with either the silica bisupport or the transition metal base metallocene catalysts prior to the reaction of the silica bisupport and the transition metal base metallocene catalysts; and washing solvents from the reacted silica bisupport and transition metal base metallocene catalysts.

25. A processing of making a polymer composition, comprising polymerizing ethylene and an optional alpha olefin in combination with a multimetal catalyst in a polymerization process to form a plurality of ethylene based polymers, wherein the plurality of ethylene based polymers form a multimodal composition distribution, each having a distinct crystallization peak in a Crystallization Elution Fractionation (CEF) curve, and wherein the distinct crystallization peaks comprise at least two peaks in a range of 40 to 110° C.

26. The process of claim 25, wherein the multimetal catalyst comprises at least two transition metal complexes of group 4 or 5, with or without a bridge between aromatic rings, immobilized on a silica bisupport and containing an alkylaluminium activator compound and/or a fluorinated activator, the at least two transition metal complexes having different metals.

27. The process of claim 25, further comprising:

reacting a silica bisupport with a first transition metal base metallocene catalyst from groups 4 or 5;

reacting an alkylaluminum activator compound and/or a fluorinated activator with either the silica bisupport or the first transition metal base metallocene catalyst prior to the reaction of the silica bisupport and the first transition metal base metallocene catalyst;

washing solvents from the reacted silica bisupport and first transition metal base metallocene catalyst;

after the washing, reacting the reacted silica bisupport and first transition metal base metallocene catalyst with a second transition metal base metallocene catalyst having a different metal than the first transition metal base metallocene catalyst; and washing solvents from the reacted silica bisupport, first transition metal base metallocene catalyst and second transition metal base metallocene catalyst.

* * * * *